United States Patent
Ahn et al.

(10) Patent No.: US 11,354,390 B2
(45) Date of Patent: Jun. 7, 2022

(54) BIOMETRIC AUTHENTICATION WITH USER INPUT

(71) Applicant: Apple Inc., Cupertino, CA (US)

(72) Inventors: Charles T. Ahn, San Francisco, CA (US); Libor Sykora, Prague (CZ); Gianpaolo Fasoli, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 72 days.

(21) Appl. No.: 15/701,400

(22) Filed: Sep. 11, 2017

(65) Prior Publication Data

US 2018/0349585 A1 Dec. 6, 2018

Related U.S. Application Data

(60) Provisional application No. 62/514,909, filed on Jun. 4, 2017.

(51) Int. Cl.

| | |
|---|---|
| *G06F 21/32* | (2013.01) |
| *G06F 21/35* | (2013.01) |
| *H04W 12/06* | (2021.01) |
| *H04W 4/80* | (2018.01) |
| *H04L 9/40* | (2022.01) |

(52) U.S. Cl.
CPC .............. *G06F 21/32* (2013.01); *G06F 21/35* (2013.01); *H04L 63/0861* (2013.01); *H04W 12/068* (2021.01); *H04W 4/80* (2018.02)

(58) Field of Classification Search
CPC ..... G06F 21/32; G06F 21/35; H04L 63/0861; H04W 12/06; H04W 4/80
See application file for complete search history.

(56) References Cited

U.S. PATENT DOCUMENTS

| | | | |
|---|---|---|---|
| 8,775,757 B2 | 7/2014 | Polzin et al. | |
| 8,832,465 B2 | 9/2014 | Gulati et al. | |
| 8,886,953 B1 | 11/2014 | Sipe et al. | |
| 9,274,647 B2* | 3/2016 | Fadell | G06F 21/36 |
| 9,400,977 B2 | 7/2016 | Brown et al. | |

(Continued)

OTHER PUBLICATIONS

International Search Report & Written Opinion in Appl. No. PCT/US2018/015079 dated Mar. 16, 2018, 15 pages.

(Continued)

*Primary Examiner* — Mohammed Waliullah
(74) *Attorney, Agent, or Firm* — Kowert, Hood, Munyon, Rankin & Goetzel, P.C.

(57) ABSTRACT

Techniques are disclosed relating to biometric authentication. In one embodiment, a computing device includes a controller circuit, a camera, and a secure circuit. The controller circuit is coupled to a button and detects when the button has been pressed. The camera captures a set of biometric data of a user. The secure circuit performs an authentication of the user by confirming that a notification identifying the button being pressed was received from the controller circuit and by comparing the set of biometric data with another set of biometric data for an authorized user of the computing device. In some embodiments, the controller circuit is configured to maintain a timestamp indicative of when the button has been pressed and usable by the secure circuit to confirm that the button is pressed within a threshold time period of the authentication being performed.

20 Claims, 9 Drawing Sheets

(56) References Cited

U.S. PATENT DOCUMENTS

| | | | |
|---|---|---|---|
| 9,547,778 B1 | 1/2017 | Paaske et al. | |
| 9,633,373 B2* | 4/2017 | Jung | G06Q 30/0262 |
| 2009/0292924 A1* | 11/2009 | Johnson | G06F 21/316 |
| | | | 713/176 |
| 2014/0191041 A1* | 7/2014 | Zhao | G06F 9/4401 |
| | | | 235/492 |
| 2014/0201540 A1* | 7/2014 | Li | H04L 9/0891 |
| | | | 713/193 |
| 2014/0245396 A1* | 8/2014 | Oberheide | G06F 21/40 |
| | | | 726/4 |
| 2015/0127550 A1* | 5/2015 | Khan | G06Q 20/382 |
| | | | 705/71 |
| 2015/0278562 A1* | 10/2015 | Adrangi | G06K 19/07354 |
| | | | 455/41.1 |
| 2015/0282073 A1* | 10/2015 | Davidson | H04W 52/0209 |
| | | | 455/41.2 |
| 2015/0348008 A1* | 12/2015 | Khan | G06Q 20/382 |
| | | | 705/44 |

OTHER PUBLICATIONS

IOS Security—White Paper, iOS 10, Mar. 2017, 68 pages.
Written Opinion in Appl. No. PCT/US2018/015079 dated May 31, 2019, 10 pages.

* cited by examiner

BIOMETRIC AUTHENTICATION WITH USER INPUT

This application claims the benefit of U.S. Prov. Appl. No. 62/514,909 filed on Jun. 4, 2017, which is incorporated by reference herein in its entirety.

BACKGROUND

Technical Field

This disclosure relates generally to user authentication, and, more specifically, to computing devices that collect biometric data.

Description of the Related Art

Traditional authentication measures typically rely on a user to provide one or more credentials attesting to the validity of the user. For example, a mobile device attempting to authenticate a user may ask the user to supply a password before allowing the user to access the device. In an effort to reduce the burden on a user, some devices may now ask a user to supply a biometric credential. For example, a mobile device may include a fingerprint sensor configured to collect fingerprint biometric information, which may be compared with stored fingerprint information of a known user. Being able to supply fingerprint information, for example, may be advantageous as it allows a user to authenticate more quickly than, for example, entering a password or some other credential.

SUMMARY

The present disclosure describes embodiments in which a computing device performs an authentication using biometric data collected by a camera. In one embodiment, the computing device includes a controller circuit coupled to a button and configured to detect when a mechanical input is received at the button from the user. In some embodiments, this mechanical input may be supplied to express an authorization to perform an authentication of the user. A secure circuit may be configured to perform the authentication of the first user by confirming that the mechanical input was received and comparing a set of biometric data captured by the camera with a set of biometric data for an authorized user of the computing device. In some embodiments, the secure circuit may also examine a timestamp indicative of when the button has been pressed in order to confirm that the button is pressed within a threshold time period of the authentication being performed.

Figure 1:
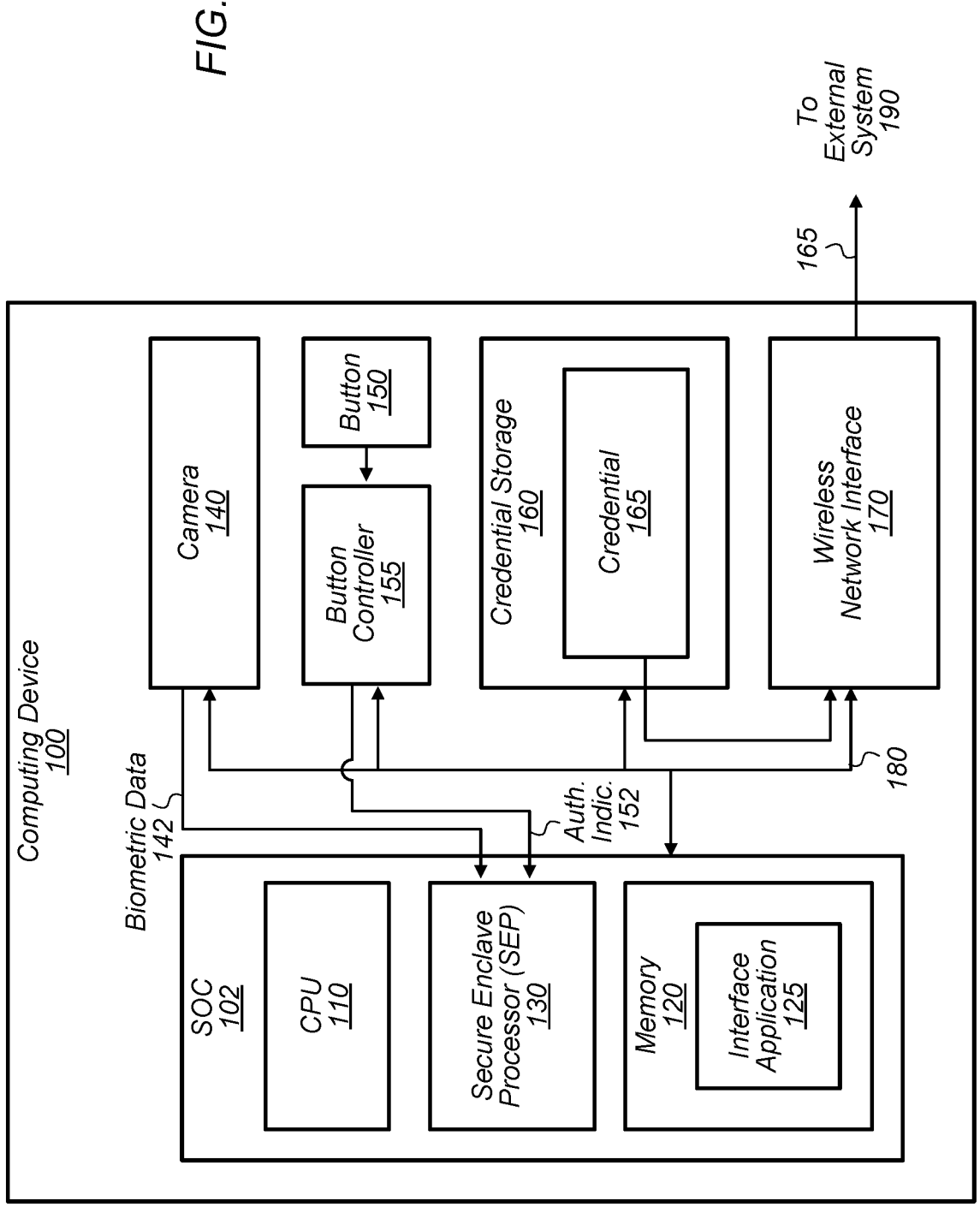
FIG. 1 is a block diagram illustrating an example of a computing device that authenticates a user based on biometric data.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "secure circuit configured to perform an authentication" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, a mobile device may have a first user and a second user. The term "first" is not limited to the initial user of the device. The term "first" may also be used when only one user of the mobile device exists.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

In some instances, a computing device may be able to perform an authentication of a user that includes collecting particular types of biometric data that can be collected without an explicit authorization from the user. For example, it may not be possible to collect fingerprint biometric data without a user's expressed intent as a user may need to willingly present a finger to a fingerprint sensor in order for the data to be collected; however, facial biometric data may be collected from a user merely because a user is seated in front of a camera of the device. This can be problematic if a user is being authenticated to perform some action, but does not actually want that action performed. For example, if a computing device were configured to provide payment information to a merchant in response to an authentication, it may be possible to collect facial biometric data from a user and successfully authenticate a user even though the user did not authorize providing the payment information.

The present disclosure describes embodiments in which a computing device performs an authentication based on, not only biometric data collected from a user, but also an additional factor indicative that a user has authorized performance of the authentication. As will be described below, in various embodiments, a computing device includes a button coupled to a controller circuit that detects when a mechanical input is received at the button from the user. If an authentication is being performed, a camera of the computing device may collect biometric data from a face of the user and supply it to a secure circuit that compares the collected biometric data against previous collected biometric data of an authorized user. In such an embodiment, the secure circuit authenticates the user based on the biometric-data comparison and a notification from a button controller indicating that the button has been pressed. That is, even if a match was identified by the comparison, the secure circuit would still indicate that the authentication failed if the notification was not received (or not received within a particular time window of the authentication being performed). Authenticating a user in this manner may be advantageous as it may prevent a user from being authenticated to perform an action that the user did not wish to have performed. In some embodiments, the use of a physical button for receiving a mechanical input may also provide additional security as merely presenting a prompt via a graphical user interface can be vulnerable to a malicious actor having remote access to the computing device. Still further, in some embodiments, the button controller and the secure circuit communicate via a secure communication channel in order to prevent the spoofing of an expressed intent to perform the authentication. Thus, if a processor running an application that requested the authentication became compromised due to malicious software, it may be incapable of sending a spoofed notification indicating the user's authorization to the secure circuit.

Turning now to FIG. 1, a block diagram of a computing device 100 is depicted. In the illustrated embodiment, computing device 100 includes a system on a chip (SOC) 102 having a central processing unit (CPU) 110, memory 120 including an interface application 125, and secure enclave processor (SEP) 130. Computing device 100 also includes a camera 140, button 150, button controller 155, credential storage 160, and wireless network interface 170. In some embodiments, computing device 100 may be implemented differently than shown. For example, in some embodiments, elements 110-130 may not be included in an SOC, computing device 100 may not include storage 160 (or storage 160 may not be distinct from memory 120), etc.

Interface application 125 is an application executable by CPU 110 to facilitate performance of a user authentication. This authentication may be performed for any of various suitable purposes. For example, this authentication may be performed in order to allow a user access to device 100 (e.g., to unlock device 100). This authentication may be performed in order to gain administrative privileges such as being able to install operating system updates, updates of particular applications, alter system settings, change a user's password, etc. This authentication may be performed in order to execute particular applications or access content of particular applications. In the illustrated embodiment, application 125 initiates an authentication in order to grant access to a credential 165 stored in credential storage 160 discussed below. In some embodiments, interface application 122 is executable to present one or more menus instructing the user on what to do during the authentication as well as indicating a result of the authentication. In some embodiments, application 122 issues instructions to elements 130-155 to cause the authentication to be performed. In some embodiments, interface application 122 may be the one performing the action for which the authentication is being performed—e.g., logging a user into device 100. In other embodiments, application 122 may be interfacing with another application that is attempting to perform the action—e.g., an application attempting to read a user's contact information from storage 160 in response to a successful user authentication. In some embodiments, application 125 may be part of an operating system executable to manage various aspects of device 100. In other embodiments, application 122 may be independent of the operating system.

SEP 130 is a secure circuit configured to authenticate an active user (i.e., the user that is currently using device 100). As used herein, the term "secure circuit" refers to a circuit that protects an isolated, internal resource from being directly accessed by an external circuit. This internal resource may be memory that stores sensitive data such as personal information (e.g., biometric information, credit card information, etc.), encryptions keys, random number generator seeds, etc. This internal resource may also be circuitry that performs services/operations associated with sensitive data. As will be described below with respect to FIG. 3, this circuitry may include an image sensor pipeline that is configured to verify biometric data 142 captured by camera 140 for a user by comparing it with previous collected biometric data of an authorized user. As noted above, in various embodiments, SEP 130 is configured to authenticate a user based on, not only biometric data 142 from camera 140, but also an additional factor indicating that a user has authorized the authentication shown as authorization indication 152 from button controller 155. Accordingly, if indication 152 has not been received (or not been received recently), SEP 130 is configured to indicate that the authentication failed even if it determined that biometric data 142 was from an authorized user.

Camera 140 is configured to collect biometric data 142 from a user's face in order to authenticate the user. As used herein, "biometric data" refers to data that uniquely identifies the user among other humans (at least to a high degree of accuracy) based on the user's physical or behavioral characteristics. Camera 140 may use any suitable technique to collect biometric data 142. Accordingly, in some embodiments, camera 140 may include an infrared (IR) emitter and an IR camera that are configured to capture multiple flood and depth image frames. When capturing a flood frame, the IR emitter may emit light from a single source, and the IR camera may collect two-dimensional image data from a user's face. When capturing a depth image frame, the IR emitter may project multiple light sources onto a user's face, and the IR camera may capture the reflections of those light sources to determine multiple depth points indicating distances from the IR camera to respective portions of the user's face. In some embodiments, the combination of flood and depth image data 142 may allow for SEP 130 to compare faces in a three-dimensional space. In other embodiments, camera 140 is configured to capture a two-dimensional image in the visible-light spectrum. In various embodiments, camera 140 communicates biometric data 142 to SEP 130 via a secure channel. As used herein, the term "secure channel" refers to either a dedicated path for communicating data (i.e., a path shared by only the intended participants) or communicating encrypted data using cryptographic keys known only to the intended participants. In some embodiments, camera 140 (or an image sensor pipeline not shown) may perform various processing operations on biometric data 142 before supplying it to SEP 130 in order to facilitate the comparison performed by SEP 130. In some embodiments, interface application 122 may perform a registration process in which camera 140 captures biometric data 142 from an authorized user in order to permit SEP 130 to subsequently authenticate the user.

Button 150, in one embodiment, is a switch configured to receive a mechanical input from a user. In some embodiments, button 150 may extrude from the housing of computing device 100 such that a user can press button 150 to provide the mechanical input. As noted above, in various embodiments, a user may press button 150 to express authorization for performance of an authentication. In some instances, a user may press button 150 in response to a prompt provided by interface application 125 instructing the user how to participate in the authentication. In other instances, pressing button 150 may cause application 125 to present a prompt and initiate performance of the authentication. In the illustrated embodiment, button controller 155 is a circuit configured to detect when button 150 has been pressed and send a corresponding authorization indication 152 to SEP 130. Accordingly, controller 155 may be configured to supply a voltage to an input of button 150 and determine whether the voltage is present at an output, indicating the button 150 has been pressed. In some embodiments, button controller 155 is configured to provide authorization indication 152 to SEP 130 via a secure channel. In various embodiments, button 150 and controller 155 may be used for additional purposes other than merely authorizing an authentication. For this reason, controller 155 may provide authorization indication 152 in response to a distinct input—e.g., two or more presses of button 150. For example, as will be described below with respect to FIG. 2, button 150 may correspond to the power button for computing device 100, and button controller 155 may be configured to manage power supplied to one or more components of computing device 100.

Credential storage 160, in one embodiment, is a memory configured to store confidential information shown in FIG. 1 as a credential 165. In some embodiments, storage 160 is distinct from memory 120; however, in other embodiments, storage 160 may correspond to a portion of memory 120. Credential 165 may correspond to any suitable confidential information for which a user may authenticate to obtain or grant access to such as a user's contacts, personal information, photographs, user names and passwords, medical information, etc. As will be described below with respect to FIG. 4, in some embodiments, credential 165 is payment information usable to initiate a transaction between a user and a merchant. Accordingly, in such an embodiment, interface application 125 may implement a wallet application executable to maintain confidential information about a user in a secure element and allow a user to access that information to make payments for purchases. In some embodiments, application 125 may present a store front that offers products and/or services available for purchase. For example, in one embodiment, application 125 may present various digital content available for purchase such as music, videos, books, and/or applications. Once a user has selected a particular item for purchase, application 125 may instruct elements 130-155 to perform an authentication of a user.

Wireless network interface 170 may correspond to any suitable interface or interfaces for communicating with an external system 190. In some embodiments, wireless network interface 170 is a wireless local area network (WLAN) interface such as a Wi-Fi™ interface or Bluetooth™ interface. In some embodiments, interface 170 is a near field communication (NFC) interface. In some embodiments, interface 170 is a wide area network (WAN) such as a cellular interface. Although described as a wireless interface 170, interface 170 may be a wired interface, in some embodiments, such as an Ethernet interface, Fibre Channel interface, etc. As will be described below, in some embodiments, network interface 170 may be used to send a credential 165 (such as payment information) to an external system 190 in response to SEP 130 indicating that the authentication was successful.

Figure 2:
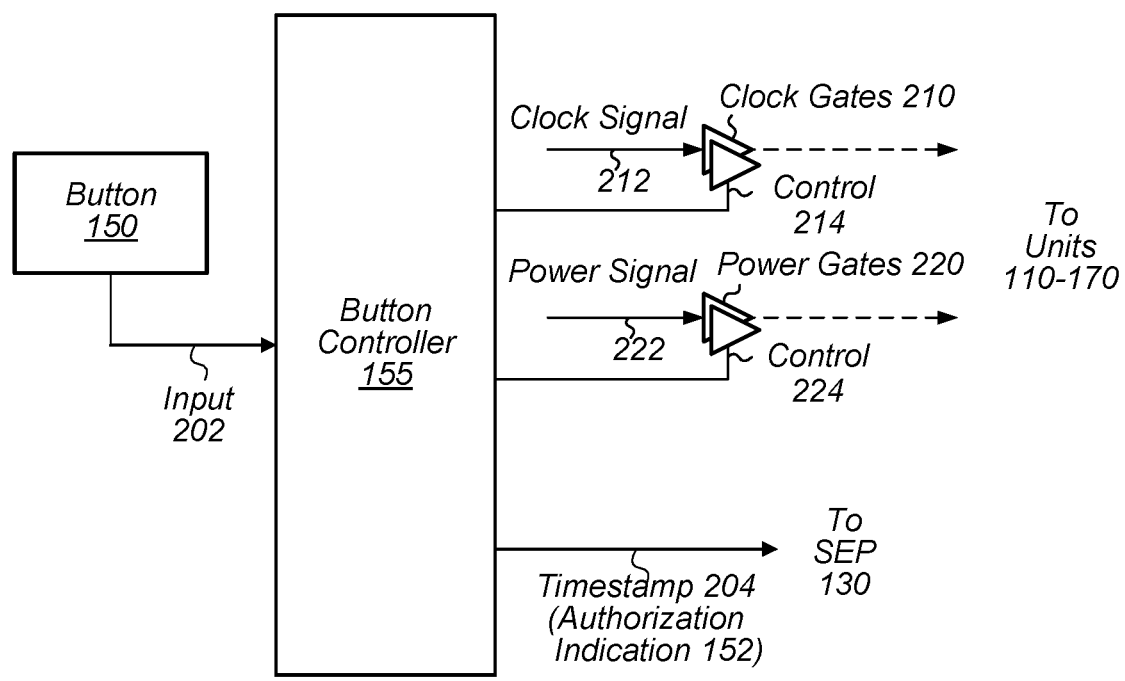
FIG. 2 is a block diagram illustrating an example of a button and a button controller included in the computing device and used for authentication.

Turning now to FIG. 2, a block diagram of button 150 and button controller 155 is depicted. As noted above, button 150 and controller 155 may be used for purposes other than merely authorizing performance of an authentication. Accordingly, in the illustrated embodiment, button controller 155 is coupled to one or more clock gates 210 and/or power gates 220.

In some embodiments, button controller 155 is configured to manage/control power supplied to one or more of elements 170. In the illustrated embodiment, this management may be performed by providing control signals 214 to clock gates 210 to gate a clock signal 212 provided to one or more elements 110-170 and/or providing control signals 224 to power gates 220 to gate a power signal 222 supplied to one or more elements 110-170. In other embodiments, other techniques may be used to manage power to elements 110-170. Elements 110-170 may be power managed responsive to any of various conditions. In one embodiment, button controller 155 may power down one or more elements 110-170 in response to an operating system determining that computing device 100 should enter a power-managed state. In such an embodiment, button controller 155 may power up one or more elements 110-170 in response to a user pressing button 150 to instruct computing device 100 to leave the power-managed state. In some embodiments, controller 155 may perform functions such as initiating a boot sequence for computing device 100 responsive to button 150 being pressed, managing a battery powering device 100, thermal management including enabling one or more fans to dissipate heat, responding to a display lid opening or closing (e.g., if computing device 100 is a notebook), enabling keyboard backlighting, etc. In some embodiments, controller 155 may correspond to a power management unit (PMU) or a system management controller (SMC).

As shown, in some embodiments, button controller 155 may receive input 202 corresponding to button 150 being pressed and convey a timestamp 204 to SEP 130. As noted above and described below, timestamp 204 may indicate a time value identifying when button 150 was pressed and be usable by SEP 130 to confirm that the button was pressed within a threshold amount of time of the authentication being performed. (In embodiments in which two or more presses of button 150 are needed, timestamp 204 may correspond to when the last press was received.) Accordingly, if timestamp 204 indicates a time value falling outside of this threshold amount, SEP 130 may indicate that the authentication failed in spite of button 150 being pressed previously. In some embodiments, timestamp 204 may be included in (or correspond to) authorization indication 152; in other embodiments, timestamp 204 may be distinct from indication 152, but sent in conjunction with indication 152. In still other embodiments, SEP 130 may initially receive input 152 as an indication that button 150 has been pressed, and SEP 130 may then issue a request to controller 155 for the timestamp 204. In some embodiments, timestamp 204 may be signed and/or encrypted by controller 155 prior to sending to SEP 130.

Figure 3:
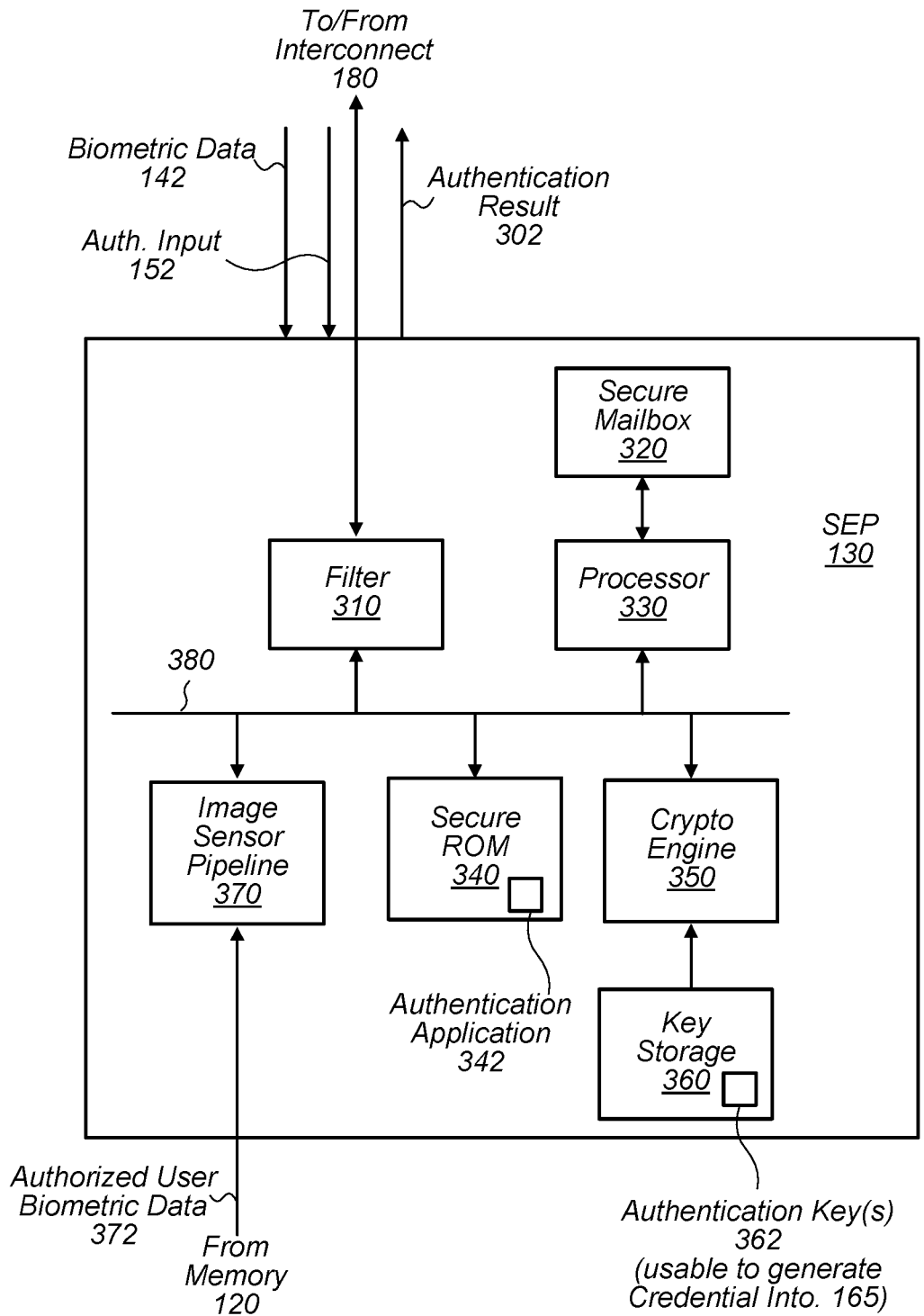
FIG. 3 is a block diagram illustrating an example of a secure circuit included in the computing device and used to verify biometric data.

Turning now to FIG. 3, a block diagram of SEP 130 is depicted. In the illustrated embodiment, SEP 130 includes a filter 310, secure mailbox 320, processor 330, secure ROM 340, cryptographic engine 350, a key storage 560, and an image sensor pipeline 370 coupled together via an interconnect 380. In some embodiments, SEP 130 may include more (or less) components than shown in FIG. 3. As noted above, SEP 130 is a secure circuit that protects an internal, resource such as components user authentication keys 362 and/or image sensor pipeline 370. As discussed below, SEP 130 implements a secure circuit through the use of filter 310 and secure mailbox 320.

Filter 310 is circuitry configured to tightly control access to SEP 130 to increase the isolation of the SEP 130 from the rest of the computing device 100, and thus the overall security of the device 100. More particularly, in one embodiment, filter 310 may permit read/write operations from a CPU 110 (or other peripherals on a fabric coupling CPU 110 and SEP 130) to enter SEP 130 only if the operations address the secure mailbox 320. Other operations may not progress from the interconnect 180 into SEP 130. Even more particularly, filter 310 may permit write operations to the address assigned to the inbox portion of secure mailbox 320, and read operations to the address assigned to the outbox portion of the secure mailbox 320. All other read/write operations may be prevented/filtered by the filter 310. In some embodiments, filter 310 may respond to other read/write operations with an error. In one embodiment, filter 310 may sink write data associated with a filtered write operation without passing the write data on to local interconnect 380. In one embodiment, filter 310 may supply nonce data as read data for a filtered read operation. Nonce data (e.g., "garbage data") may generally be data that is not associated with the addressed resource within the SEP 130. Filter 310 may supply any data as nonce data (e.g. all zeros, all ones, random data from a random number generator, data programmed into filter 310 to respond as read data, the address of the read transaction, etc.).

In various embodiments, filter 310 may only filter incoming read/write operations. Thus, the components of the SEP 130 may have full access to the other components of computing device 100 including CPU 110, memory 120, camera 140, and/or button controller 155. Accordingly, filter 310 may not filter responses from interconnect 180 that are provided in response to read/write operations issued by SEP 130.

Secure mailbox 320 is circuitry that, in some embodiments, includes an inbox and an outbox. Both the inbox and the outbox may be first-in, first-out buffers (FIFOs) for data. The buffers may have any size (e.g. any number of entries, where each entry is capable of storing data from a read/write operation). Particularly, the inbox may be configured to store write data from write operations sourced from CPU 110. The outbox may store write data from write operations sourced by processor 330. (As used herein, a "mailbox mechanism" refers to a memory circuit that temporarily stores 1) an input for a secure circuit until it can be retrieved by the circuit and/or 2) an output of a secure circuit until it can be retrieved by an external circuit.)

In some embodiments, software executing on CPU 110 (e.g., application 125) may request services of SEP 130 via an application programming interface (API) supported by an operating system of computing device 100—i.e., a requester may make API calls that request services of SEP 130. These calls may cause corresponding requests to be written to mailbox mechanism 320, which are then retrieved from mailbox 320 and analyzed by processor 330 to determine whether it should service the requests. Accordingly, this API may be used to deliver biometric data 142 and authorization indication 152 to mailbox 320, request authentication of a user by verifying this information, and delivering an authentication result 302 via mailbox. By isolating SEP 130 in this manner, integrity of image sensor pipeline 370 may be enhanced.

SEP processor 330 is configured to process commands received from various sources in computing device 100 (e.g. from CPU 110) and may use various secure peripherals to accomplish the commands. Processor 330 may then execute instructions stored in ROM 340 such as authentication application 342 to perform an authentication of a user. For example, SEP processor 330 may execute application 342 to provide appropriate commands to image sensor pipeline 370 in order to verify biometric data 142 and/or indication 152. In some embodiments, application 342 may include encrypted program instructions loaded from a trusted zone in memory 120.

Secure ROM 340 is a memory configured to store program instruction for booting SEP 130. In some embodiments, ROM 340 may respond to only a specific address range assigned to secure ROM 340 on local interconnect 380. The address range may be hardwired, and processor 330 may be hardwired to fetch from the address range at boot in order to boot from secure ROM 340. Filter 310 may filter addresses within the address range assigned to secure ROM 340 (as mentioned above), preventing access to secure ROM 340 from components external to the SEP 130. In some embodiments, secure ROM 340 may include other software executed by SEP processor 330 during use. This software may include the program instructions to process inbox messages and generate outbox messages, code to interface with secure element 130, etc.

Cryptographic engine 350 is circuitry configured to perform cryptographic operations for SEP 130, including key generation as well as encryption and decryption using keys in key storage 360. Cryptographic engine 350 may implement any suitable encryption algorithm such as DES, AES, RSA, etc. In some embodiments, engine 350 may further implement elliptic curve cryptography (ECC). In various embodiments, engine 350 is responsible for decrypting traffic received from camera 140 and button controller 155 described above and encrypting traffic sent to secure element 400 discussed below.

Key storage 360 is a local memory (i.e., internal memory) configured to store cryptograph keys. In some embodiments, these keys may include keys used to establish the secure channels between SEP 130 and elements 140, 155, and 400 (discussed below). As shown, in some embodiments, these keys include authentication keys 362. As will be described below with respect to FIG. 5C, in some embodiments, SEP 130 may be configured to generate a credential 165 (as opposed to using one from storage 160). In such an embodiment, crypto engine 350 may use a key 362 to generate a digital signature, which may be provided to external system 190. In one embodiment, external system 190 may store payment information for a user and convey that information along to a merchant in response to the user authenticating with system 190 by providing a digital signature generated by a key 362 after SEP 130 has successfully authenticated the user.

Image sensor pipeline 370, in one embodiment, is circuitry configured to compare biometric data 142 captured from a user being authenticated with biometric data 372 of an authorized user. In some embodiments, pipeline 370 may perform the comparison using a collection of neural networks included in pipeline 370, each network being configured to compare biometric data 142 captured in a single frame with biometric data 372 captured in multiple frames for an authorized user. As shown, pipeline 370 may be configured to read, from memory 120, biometric data 372, which may be protected by encryption in some embodiments or being stored in an associated part of memory 120 that is only accessible to SEP 130. (In another embodiment, SEP 130 may store data 372 internally.) In some embodiments, pipeline 370 may also verify the presence of authorization indication 152. (In other embodiments, this verification may be performed by another element of SEP 130 such as authentication application 342). In such an embodiment, this verification may include comparing timestamp 204 against the current time and determining whether the difference between timestamp 204 and the current time exceeds a threshold value—exceeding the threshold value resulting in a failure of the authentication. Based on the comparison of biometric data 142 and the presence of authorization indication 152, SEP 130 may provide an authentication result 302 indicating whether the authentication was successful or failed.

Figure 4:
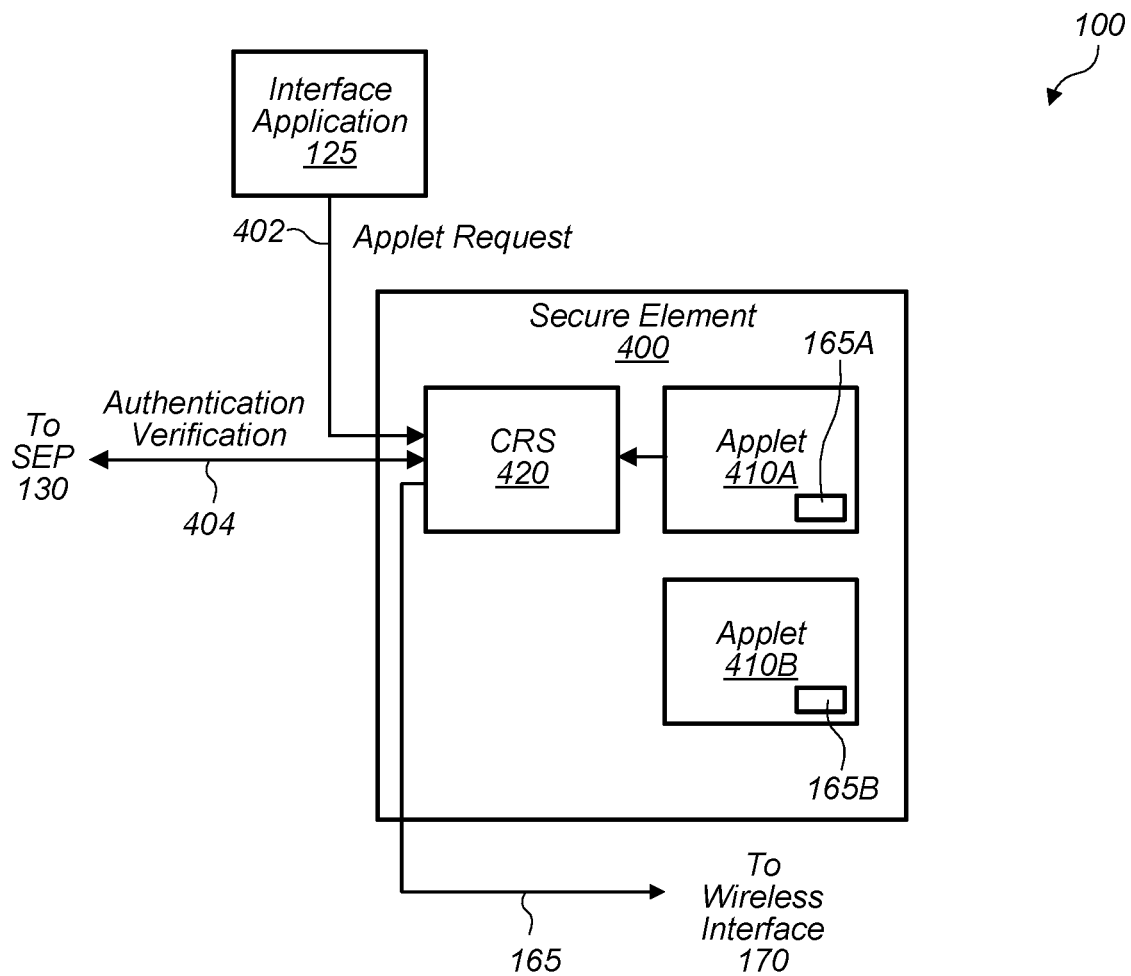
FIG. 4 is a block diagram illustrating an example of a secure element included in the computing device.

Turning now to FIG. 4, a block diagram of a secure element 400 is depicted. As noted above, in some embodiments, credential storage 160 is configured to implement a secure element 400 for providing transaction information. In the illustrated embodiment, secure element 400 includes multiple applets 410 and a contactless registry service (CRS) applet 420.

Secure element 400 is a secure circuit configured to store confidential information of a user (shown as credentials 165A and 165B) such as a user's payment information. In various embodiments, these credentials 165 are maintained by applets 410, where each applet 410 maintains a respective credential 165 associated with a respective entity associated with that applet 410. For example, applet 410A may maintain a credential 165A usable to authorize transactions using a first transaction instrument (e.g., a user's American Express™ card) provided by a first transaction provider (e.g., American Express™); applet 410B may maintain a credential 165B usable to authorize transactions using a second transaction instrument (e.g., a user's Visa™ card) provided by a second transaction provider (e.g., Visa™). When the user selects a particular transaction instrument via interface application 125 to be used in a transaction, application 125 may issue a corresponding applet request 402 to the CRS applet 420 to request use of that particular transaction instrument's corresponding applet 410.

As used herein, the "contactless registry service (CRS)" refers generally to an application that controls access to a wireless interface such wireless interface 170. Accordingly, in response to receiving a request 402, CRS applet 420 may confirm that the user was successfully authenticated before permitting the requested applet 410 from sending its credential 165 to external system 190 via wireless interface 170. In some embodiments, this verification 404 may include secure element 400 issuing a request to SEP 130 for a response confirming that the user was successfully authenticated. In other embodiments, SEP 130 may deliver a token to SE 400 after SEP 130 has successfully authenticated the user, and verification 404 may include CRS applet 420 confirming the presence of the token before permitting the sending of a credential 165. In some embodiments, upon allowing an applet 410 to send a credential 165, CRS applet 420 may instruct SEP 130 to discard a stored indication of the successful authentication in order to require a subsequent authentication if any additional request 402 is received.

Examples of communications between elements 110-170 will now be discussed with respect to FIGS. 5A-5C.

Figure 5A:
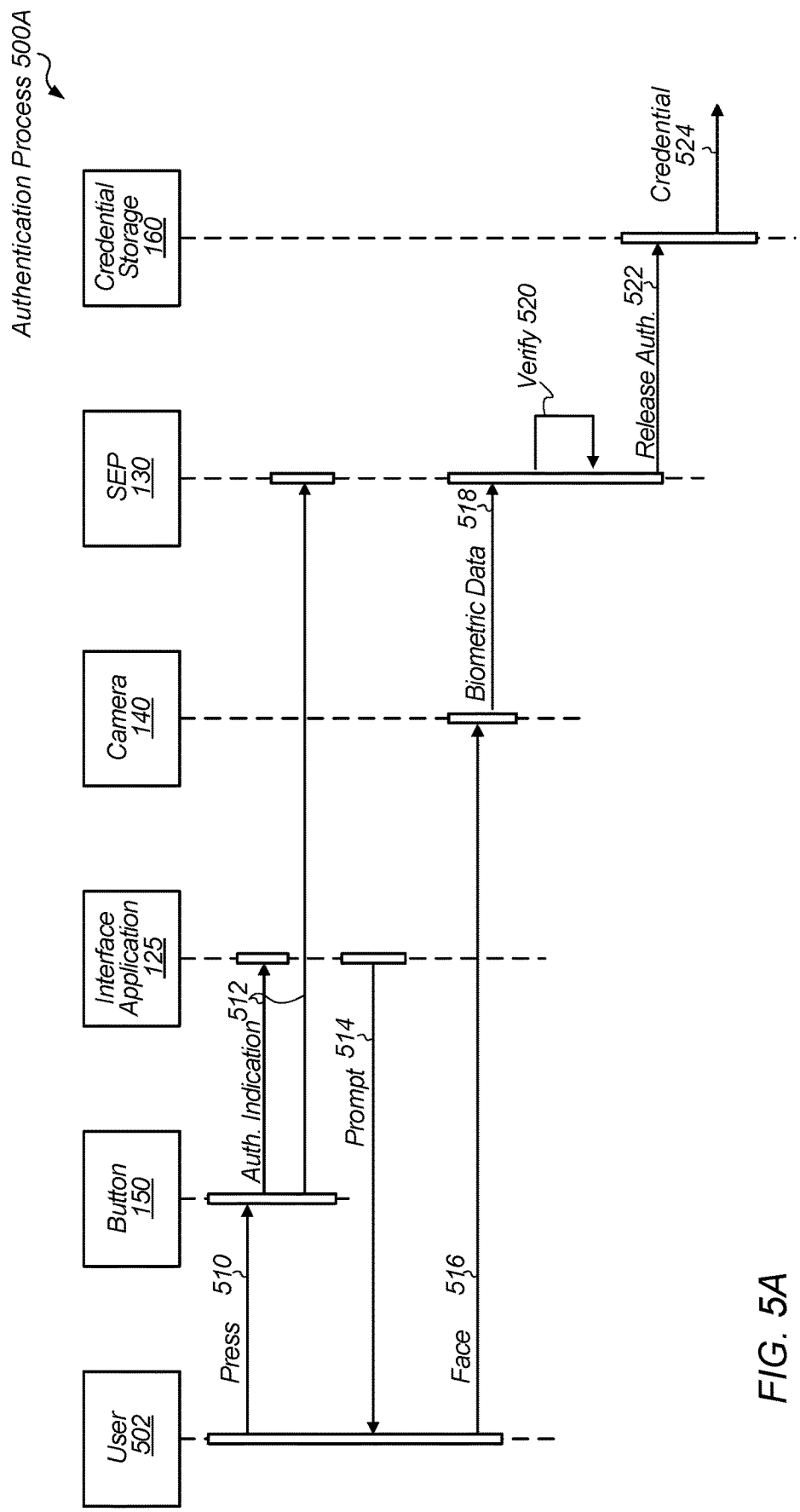
FIGS. 5A-5C are communicating diagrams illustrating exemplary exchanges that may occur between components of the computing device during an authentication.

Turning now to FIG. 5A, a communication diagram of one example of an authentication process 500A is depicted. In the illustrated embodiment, authentication process 500A is performed to release a credential 165 from credential storage 160. As noted above, this credential 165 may be some form of confidential information such as a user name and password for entry into a web browser form in some embodiments. In some embodiments, steps 510-524 may be performed in a different order than shown or concurrently.

As shown, process 500 begins, at 510, with a user 502 processing button 150. At 512, button 150 (or button controller 155) conveys an authorization indication 152 to interface application 125 and SEP 130. At 514, in response to the indication 152, application 125 may present a prompt 514 acknowledging the press at 510 and presenting one or more instructions to the user such as asking the user to present a face to camera 140. At 516, user 502 presents a face to camera 140, which captures biometric data 142 and sends it to SEP 130 at 518. At 520, SEP 130 authenticates the user by verifying the presence of authorization indication 152 and comparing the biometric data 142 against biometric data of a known user. If the authentication is successful a release authorization is conveyed to credential storage 160 at 522 indicating that realize of the credential 165 is authorized, which occurs at 524.

Figure 5B:
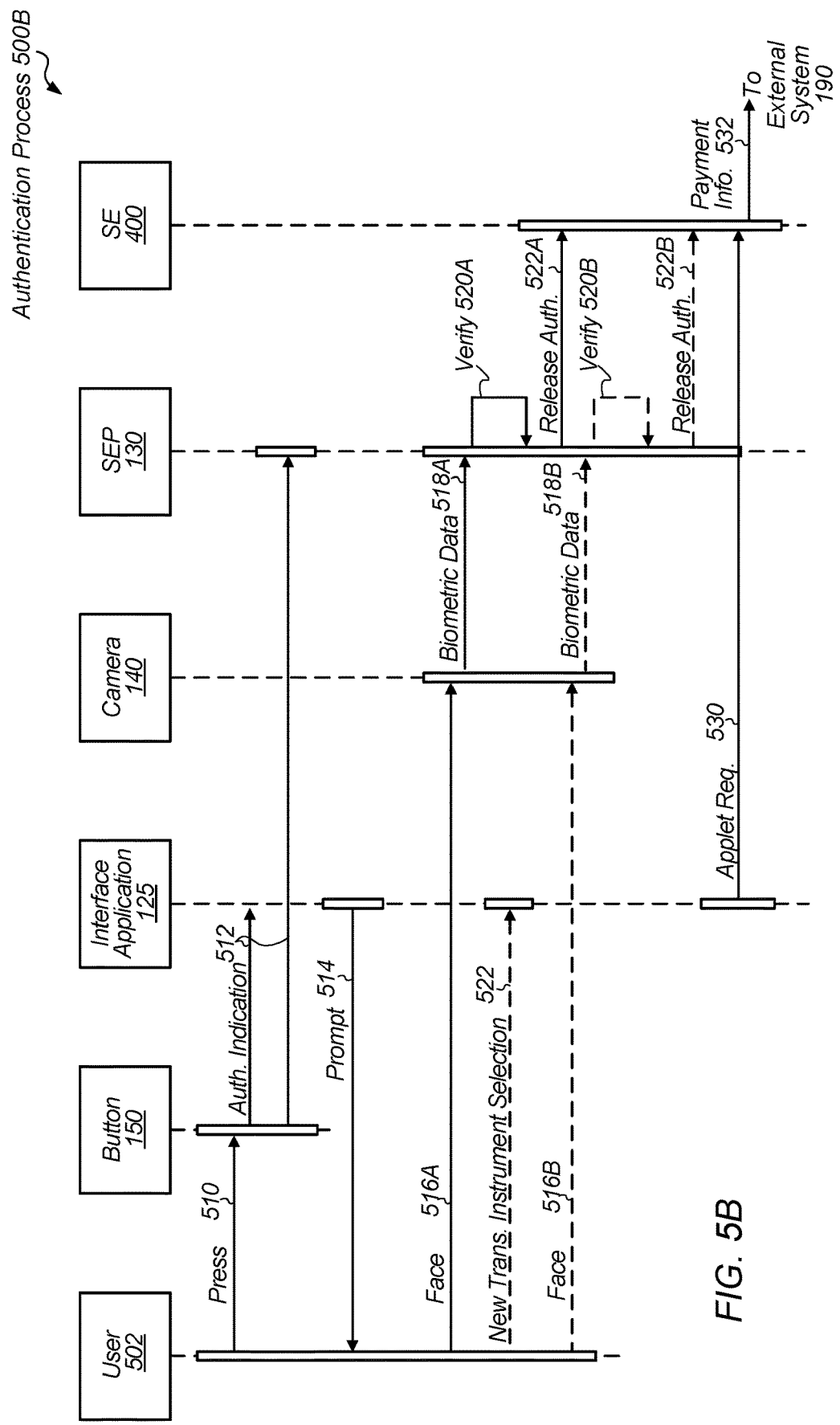

Turning now to FIG. 5B, a communication diagram of another example of an authentication process 500B is depicted. In the illustrated embodiment, process 500B is performed to send payment information from secure element 400 to external system 190, which, in some embodiments, may be a point-of-sale terminal having an NFC reader. In some embodiments, steps 510-532 may be performed in a different order than shown.

Similar to process 500A, process 500B may begin at 510 with a button 150 being pressed and an authentication indication 152 being sent to application 125 and SEP 130. At 514, application 125 may provide a prompt acknowledging the press. In some embodiments, the prompt may present a default transaction instrument associated with the payment information to be conveyed to external system 190, but may allow the user to select an alternative transaction instrument if the user wants to use another one (e.g., selecting a Visa™ card instead of an American Express™ card). Camera 140 may then capture biometric data 142 from a user's face at 516A and convey it at 518A to SEP 130, which attempts to verify the authentication indication 152 and biometric data 142 at 520A. If the authentication is successful, SEP 130 may then send a release authorization at 522A indicating that SE 400 is permitted to send the payment information.

If, however, the user selects a different transaction instrument at 522, camera 140 may capture another set of biometric data 142 at 516B and send it to SEP 130 at 518B. At 520B, SEP 130 attempts to verify this new biometric data 142 and the authentication indication 152 from 512. Notably, in some embodiments, SEP 130 does not require another press of button 150 and instead relies on the earlier received indication 152; however, in the illustrated embodiment, another set of biometric data 142 is collected. If SEP 130's verification is successful, a realize authorization is sent at 522B, and payment information is sent from SE 400 to external system 190 at 532.

Figure 5C:
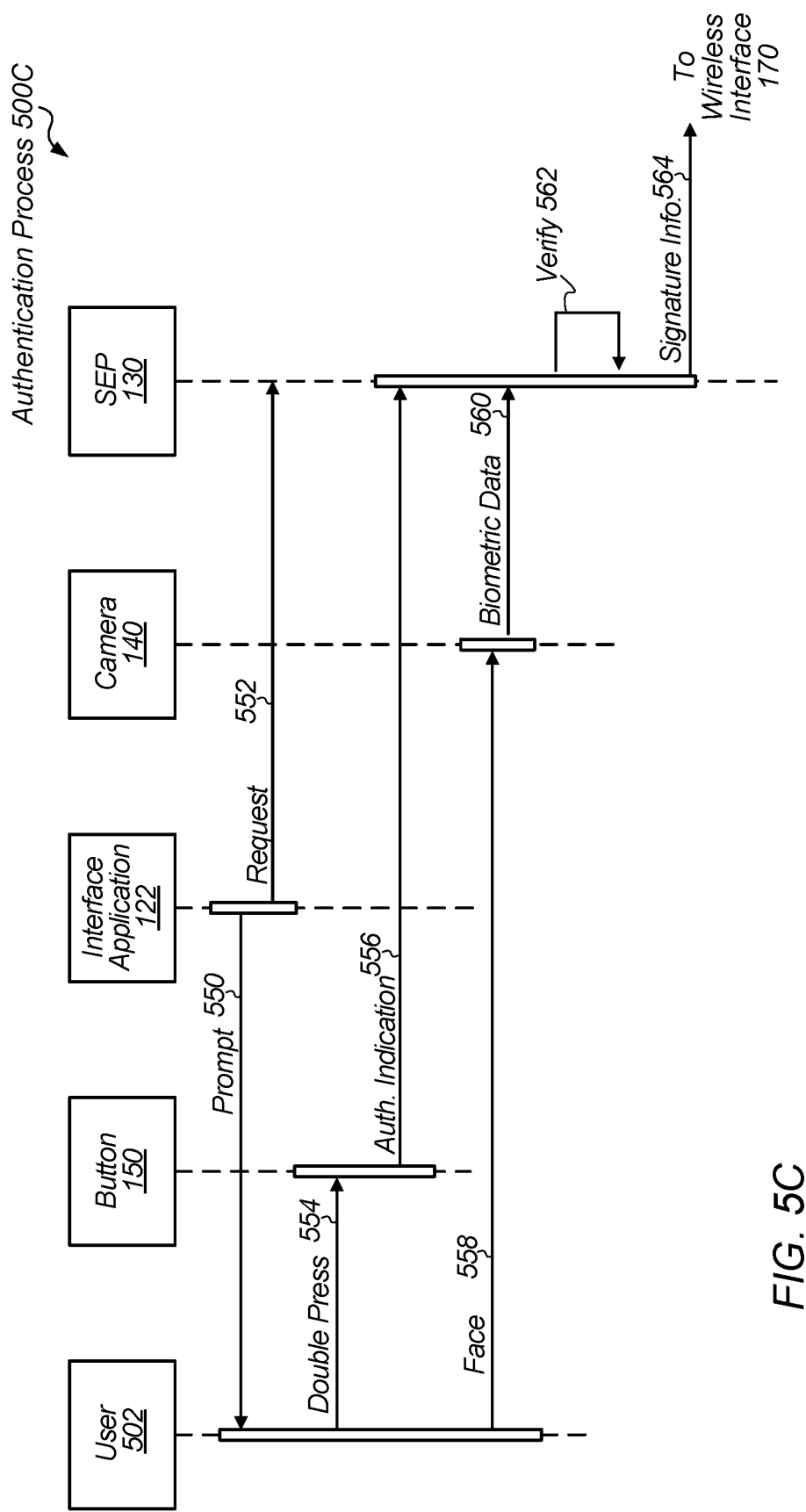

Turning now to FIG. 5C, a communication diagram of still another example of an authentication process 500C is depicted. In the illustrated embodiment, process 500C is performed to send signature information, which may be generated by SEP 130 using a key 362 and used to authenticate a user to an external system 190. In some embodiments, steps 550-564 may be performed in a different order than shown.

As shown, process 500C begins at 550 with application 122 presenting a prompt to a user. In some embodiments, this prompt may ask the user to press button 150 twice to confirm that the user authorizes performance of process 500C (or more generally being authenticated). Application 122 may also send a request, at 552, for SEP 130 to provide signature information to wireless interface 170 for communication. At 554, button 150 receives a double press from a user 502, and an authorization indication 152 is sent to SEP 130 at 556. At 558, user 505 presents a face to camera, which captures biometric data 142 and conveys it, at 560, to SEP 130. SEP 130 then verifies the data 142 and indication 152 to authenticate the user at 562. At 564, SEP 130 generates a digital signature and sends it as signature information to wireless interface 170, which may convey the information on to external system 190 for some use—e.g., authenticating the user for a purchase through system 190.

Figure 6A:
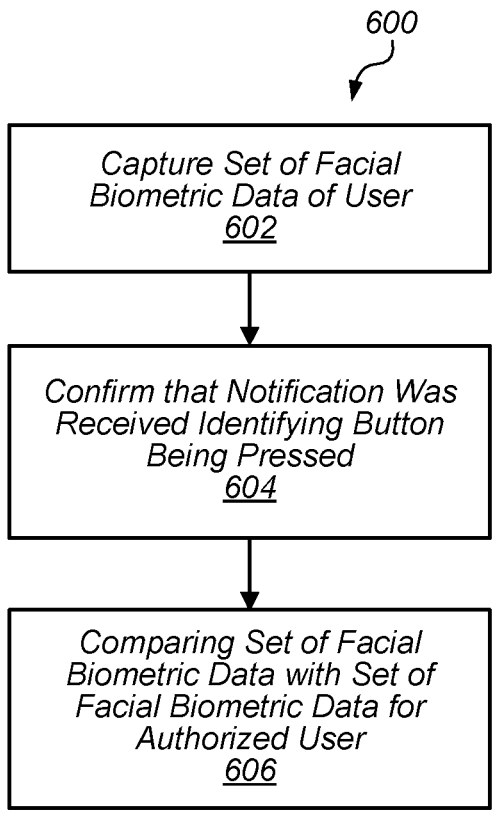
FIGS. 6A and 6B are flow diagrams illustrating examples of methods for authenticating a user.

Turning now to FIG. 6A, a flow diagram of a method 600 is depicted. Method 600 is one embodiment of a method for authenticating a user. In some embodiments, method 600 is performed by a computing device having a camera and a secure circuit such as computing device 100. In many instances, performance of method 600 may allow for a more secure authentication. In some embodiments, steps 602-606 may be performed in a different order than shown and/or concurrently.

In step 602, a camera (e.g., camera 140) of the computing device captures a first set of biometric data (e.g., biometric data 142) of a first user. In some embodiments, this biometric data may include IR data captured from a user's face. In some embodiments, this biometric data may include multiple flood and depth frames usable to compare a user's face in three-dimensional space with a face of an authorized user.

In step 604, a secure circuit (e.g., SEP 130) performs an authentication of the first user by confirming that a notification (e.g., authorization indication 152) was received from a controller circuit (e.g., button controller 155), the notification identifying a button (e.g., button 150) being pressed. In such an embodiment, the controller circuit is coupled to the button and configured to detect when the button has been pressed. In some embodiments, the controller circuit is configured to provide a timestamp (e.g., timestamp 204) indicative of when the button has been pressed, and the timestamp is usable by the secure circuit to confirm that the button is pressed within a threshold time period of the authentication being performed. In some embodiments, the controller circuit is configured to provide the notification to the secure circuit after detecting at least two presses of the button. In some embodiments, the control circuit controls power provided to one or more components of the computing device responsive to the button being pressed. In some embodiments, the control circuit sends the notification to the secure circuit via a secure channel between the controller circuit and the secure circuit.

In step 606, the secure circuit further performs the authentication by comparing the first set of biometric data with a second set of biometric data (e.g., biometric data 372) for an authorized user of the computing device. In some embodiments, the secure circuit is isolated from access except through a mailbox mechanism (e.g., mailbox 320), and the secure circuit is configured to receive the notification and the first set of biometric data via the mailbox mechanism. In various embodiments, the computing device (e.g., using interface application 125) presents, to the first user, a prompt (e.g., prompt 514 or 550) associated with a financial transaction to be performed. In some embodiments, a secure element (e.g., secure element 400) of the computing device receives, from the secure circuit, an indication (e.g., release authorization 522) that the first user has been successfully authenticated and sends, via an NFC radio, transaction information of the first user for the financial transaction. In some embodiments, the secure circuit sends, based on the authentication, send transaction information (e.g., payment information 564) of the first user via a wireless interface. In some embodiments, the prompt indicates a first transaction instrument to be used for the financial transaction, and the computing device receives, via the prompt, a selection of a second transaction instrument for the financial transaction. In some embodiments, the secure circuit, in response to the selection of the second transaction instrument, performs another authentication of the first user by confirming that the notification was received, receiving, from the camera, a third set of biometric data of the first user captured after the first set of biometric data, and comparing the third set of biometric data with the second set of biometric data. In some embodiments, the prompt is presented responsive to the controller circuit detecting the button being pressed.

Figure 6B:
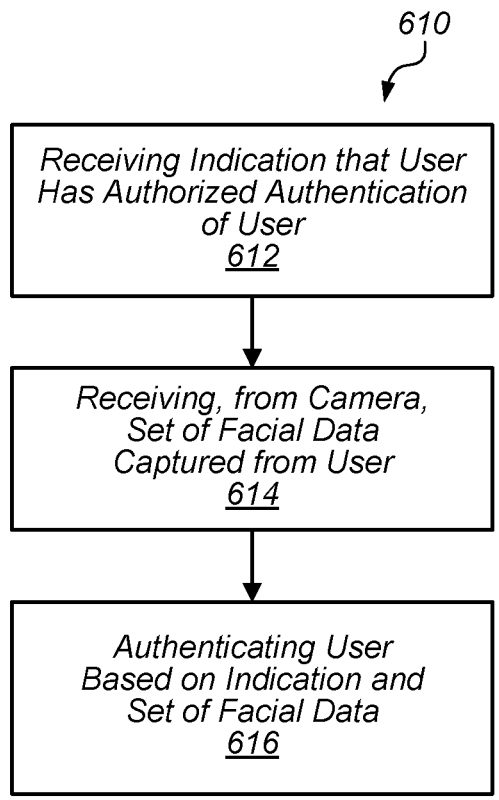

Turning now to FIG. 6B, a flow diagram of a method 610 is depicted. Method 610 is one embodiment of a method for authenticating a user. In some embodiments, method 610 is performed by a computing device having a camera and a secure circuit such as computing device 100. In many instances, performance of method 610 may allow for a more secure authentication. In some embodiments, steps 612-616 may be performed in a different order than shown and/or concurrently.

In step 612, a secure circuit (e.g., SEP 130) of the computing device receives an indication (e.g., authorization indication 152) that a user has authorized an authentication of the user. In various embodiments, the indication is received from a control circuit (e.g., button controller 155) configured to detect a mechanical input received at a button of the computing device. In some embodiments, the indication includes a time value (e.g., timestamp 204) indicating when the input was supplied. In some embodiments, the control circuit initiates a boot sequence of the computing device responsive to a mechanical input being received at the button.

In step 614, the secure circuit receives, from a camera (e.g., camera 140) of the computing device, a first set of facial data (e.g., biometric data 142) captured from the user such as described above.

In step 616, the secure circuit authenticates the user based on the received indication and the first set of facial data matching a second set of facial data (e.g., biometric data 372) associated with an authorized user account of the computing device. In some embodiments, the authenticating includes determining a difference between a current time value and the included time value in the notification and comparing the determined difference with a threshold value. In some embodiments, the secure circuit sends a result (e.g., via user verification 404) of the authenticating to a secure element (e.g., secure element 400) of the computing device and, in response to the result, the secure element communicates payment information for a transaction via a near field communication (NFC) radio. In some embodiments, the secure circuit performs the authenticating with respect to a first transaction instrument for a transaction, and the computing device receives a request to use a second transaction instrument for the transaction. In such an embodiment, the secure circuit, in response to the request, performs another authentication based on the indication and a third set of facial data received from the camera.

Exemplary Computer System

Figure 7:
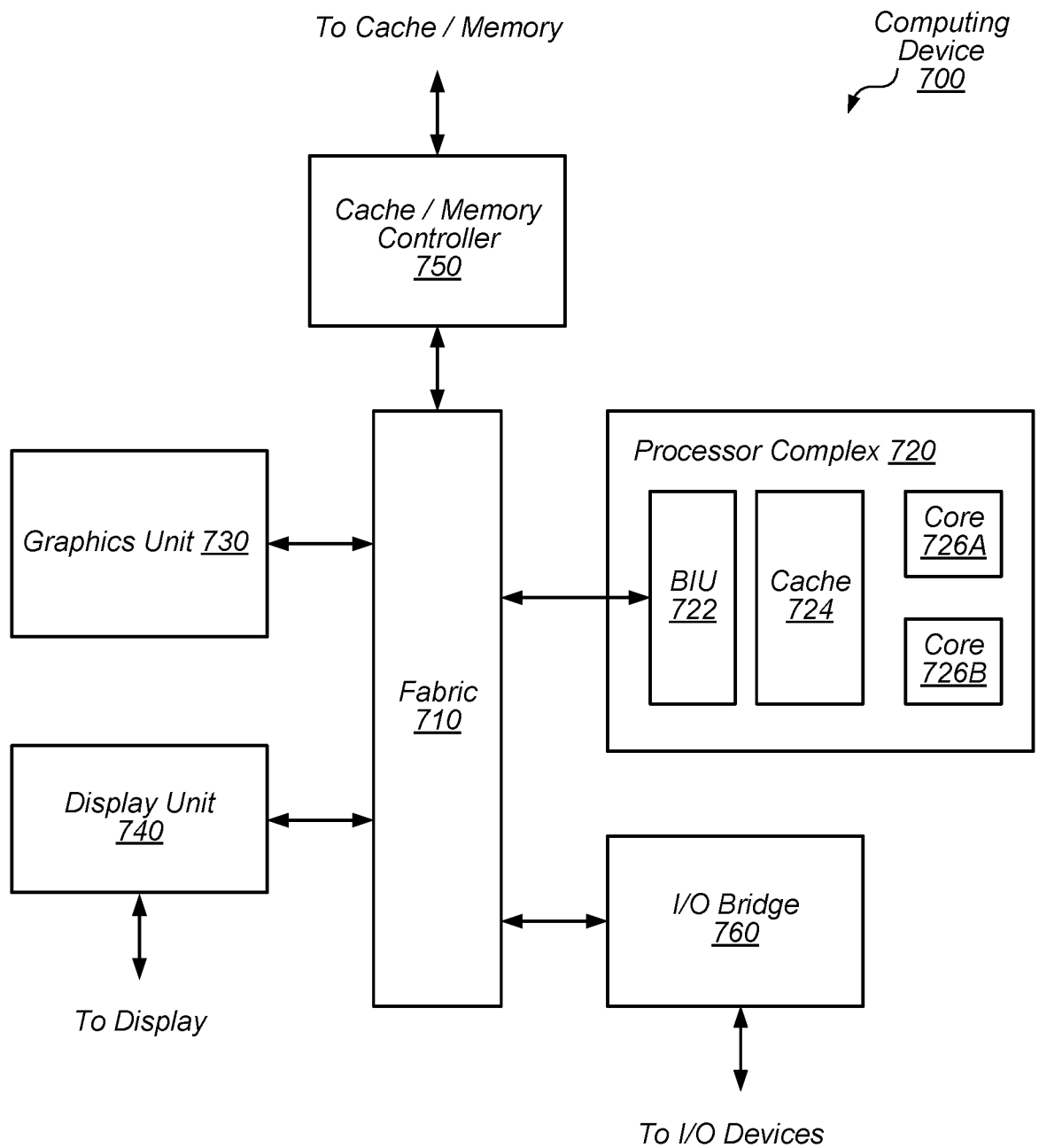
FIG. 7 is a block diagram illustrating one embodiment of an exemplary computer system.

Turning now to FIG. 7, a block diagram illustrating an exemplary embodiment of a computing device 700 is shown. In various embodiments, computing device 700 functionally described herein and may correspond to device 100 discussed above. In some embodiments, elements of device 700 may be included within a system on a chip (SOC). In some embodiments, device 700 may be included in a mobile device, which may be battery-powered. Device 700 may, however, be suitable computing device such as server system, personal computer system, desktop computer, laptop or notebook computer, mainframe computer system, tablet computer, handheld computer, workstation, network computer, a consumer device such as a mobile phone, music player, or personal data assistant (PDA). In the illustrated embodiment, device 700 includes fabric 710, processor complex 720, graphics unit 730, display unit 740, cache/memory controller 750, input/output (I/O) bridge 760.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally. As used herein, the term "coupled to" may indicate one or more connections between elements, and a coupling may include intervening elements. For example, in FIG. 7, graphics unit 730 may be described as "coupled to" a memory through fabric 710 and cache/memory controller 750. In contrast, in the illustrated embodiment of FIG. 7, graphics unit 730 is "directly coupled" to fabric 710 because there are no intervening elements.

In the illustrated embodiment, processor complex 720 includes bus interface unit (BIU) 722, cache 724, and cores 726A and 726B. In various embodiments, processor complex 720 may include various numbers of processors, processor cores and/or caches. For example, processor complex 720 may include 1, 2, or 4 processor cores, or any other suitable number. In one embodiment, cache 724 is a set associative L2 cache. In some embodiments, cores 726A and/or 726B may include internal instruction and/or data caches. In some embodiments, a coherency unit (not shown) in fabric 710, cache 724, or elsewhere in device 700 may be configured to maintain coherency between various caches of device 700. BIU 722 may be configured to manage communication between processor complex 720 and other elements of device 700. Processor cores such as cores 726 may be configured to execute instructions of a particular instruction set architecture (ISA), which may include operating system instructions and user application instructions. These instructions may be stored in computer readable medium such as a memory coupled to memory controller 750 discussed below. In some embodiments, processor complex 720 may correspond to CPU 110 discussed above.

Graphics unit 730 may include one or more processors and/or one or more graphics processing units (GPU's). Graphics unit 730 may receive graphics-oriented instructions, such as OPENGL®, Metal, or DIRECT3D® instructions, for example. Graphics unit 730 may execute specialized GPU instructions or perform other operations based on the received graphics-oriented instructions. Graphics unit 730 may generally be configured to process large blocks of data in parallel and may build images in a frame buffer for output to a display. Graphics unit 730 may include transform, lighting, triangle, and/or rendering engines in one or more graphics processing pipelines. Graphics unit 730 may output pixel information for display images.

Display unit 740 may be configured to read data from a frame buffer and provide a stream of pixel values for display. Display unit 740 may be configured as a display pipeline in some embodiments. Additionally, display unit 740 may be configured to blend multiple frames to produce an output frame. Further, display unit 740 may include one or more interfaces (e.g., MIPI® or embedded display port (eDP)) for coupling to a user display (e.g., a touchscreen or an external display).

Cache/memory controller 750 may be configured to manage transfer of data between fabric 710 and one or more caches and/or memories. For example, cache/memory controller 750 may be coupled to an L3 cache, which may in turn be coupled to a system memory. In other embodiments, cache/memory controller 750 may be directly coupled to a memory. In some embodiments, cache/memory controller 750 may include one or more internal caches. Memory coupled to controller 750 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 750 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by processor complex 720 to cause device 700 to perform functionality described herein. In some embodiments, memory coupled to controller 750 may correspond to memory 120 discussed above.

I/O bridge 760 may include various elements configured to implement universal serial bus (USB) communications, security, audio, and/or low-power always-on functionality, for example. I/O bridge 760 may also include interfaces such as pulse-width modulation (PWM), general-purpose input/output (GPIO), serial peripheral interface (SPI), and/or inter-integrated circuit (I2C), for example. Various types of peripherals and devices may be coupled to device 700 via I/O bridge 760. For example, these devices may include various types of wireless communication (e.g., wifi, Bluetooth, cellular, global positioning system, etc.), additional storage (e.g., RAM storage, solid state storage, or disk storage), user interface devices (e.g., keyboard, microphones, speakers, etc.), etc.

The present disclosure contemplates that the entities responsible for the collection, analysis, disclosure, transfer, storage, or other use of personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, in the case of unlocking and/or authorizing devices using facial recognition, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computing device, comprising:
a controller circuit coupled to a button, wherein the controller circuit is configured to detect when the button has been pressed;
a camera configured to capture a first set of biometric data of a first user; and
a secure circuit configured to:
receive a notification from the controller circuit, wherein the notification identifies the button being pressed; and
perform an authentication of the first user by:
confirming, as a first factor of the authentication, that the notification was received by the secure circuit within a threshold time period of the authentication being performed, by:
determining a difference between a current time value and a time value associated with the received notification; and
comparing the determined difference with a threshold value; and
comparing, as a second factor of the authentication, the first set of biometric data with a second set of biometric data for an authorized user of the computing device.

2. The computing device of claim 1, wherein the controller circuit is configured to:
provide a timestamp indicative of when the button has been pressed, wherein the timestamp is usable by the secure circuit.

3. The computing device of claim 1, wherein the controller circuit is configured to:
control power provided to one or more components of the computing device responsive to the button being pressed; and
send the notification to the secure circuit via a secure channel between the controller circuit and the secure circuit.

4. The computing device of claim 1, further comprising:
a processor; and
memory having program instructions stored therein that are executable by the processor to cause the computing device to present, to the first user, a prompt associated with a financial transaction to be performed.

5. The computing device of claim 4, further comprising:
a near-field communication (NFC) radio; and
a secure element configured to:
receive, from the secure circuit, an indication that the first user has been successfully authenticated; and
sending, via the NFC radio, transaction information of the first user for the financial transaction.

6. The computing device of claim 4, further comprising:
a wireless interface; and
wherein the secure circuit is configured to:
based on the authentication, send transaction information of the first user via the wireless interface.

7. The computing device of claim 4, wherein the prompt indicates a first transaction instrument to be used for the financial transaction; and wherein the program instructions are executable to cause the computing device to receive, via the prompt, a selection of a second transaction instrument for the financial transaction.

8. The computing device of claim 7, wherein the secure circuit is configured to:
in response to the selection of the second transaction instrument, perform another authentication of the first user by:
confirming that the notification was received;
receiving, from the camera, a third set of biometric data of the first user captured after the first set of biometric data; and
comparing the third set of biometric data with the second set of biometric data.

9. The computing device of claim 1, wherein the secure circuit is configured to:
indicate that the authentication failed in response to confirming, as the first factor of the authentication, that the notification was not received by the secure circuit within the threshold time period of the authentication being performed.

10. The computing device of claim 1, wherein the controller circuit is configured to provide the notification to the secure circuit after detecting at least two presses of the button.

11. The computing device of claim 1, wherein the secure circuit is isolated from access except through a mailbox mechanism, and wherein the secure circuit is configured to receive the notification and the first set of biometric data via the mailbox mechanism.

12. A method, comprising:
a secure circuit of a computing device receiving an indication that a user has authorized an authentication of the user, wherein the indication is received from a control circuit configured to detect a mechanical input received at a button of the computing device;
the secure circuit receiving, from a camera of the computing device, a first set of facial data captured from the user; and
the secure circuit authenticating the user;
wherein a first factor of the authenticating includes the first set of facial data matching a second set of facial data associated with an authorized user account of the computing device; and
wherein a second factor of the authenticating includes:
determining a difference between a current time value and a time value associated with the received indication; and
comparing the determined difference with a threshold value; and
the secure circuit indicating that the authenticating has failed in response to the second factor not being satisfied.

13. The method of claim 12, further comprising:
the control circuit initiating a boot sequence of the computing device responsive to a mechanical input being received at the button.

14. The method of claim 12, further comprising:
the secure circuit sending a result of the authenticating to a secure element of the computing device; and
in response to the result, the secure element communicating payment information for a transaction via a near field communication (NFC) radio.

15. The method of claim 12, further comprising:
the secure circuit performing the authenticating with respect to a first transaction instrument for a transaction;
the computing device receiving a request to use a second transaction instrument for the transaction; and
in response to the request, the secure circuit performing another authentication based on the indication and a third set of facial data received from the camera.

16. A computing device, comprising:
a button configured to receive a mechanical input from a user requesting performance of an authentication;
a camera configured to capture a set of facial biometric data of the user;
a processor;
memory having program instructions stored therein that are executable by the processor to cause the computing device to:
present, to the user, a prompt indicating performance of the authentication; and
a secure circuit configured to:
maintain a timestamp associated with a notification received by the secure circuit and indicative of the mechanical input being received; and
authenticate the user based on 1) the timestamp being within a threshold time period of the authentication being performed and 2) the set of facial biometric data.

17. The computing device of claim 16, further comprising:
a secure element associated with a near field communication (NFC) radio, wherein the secure element is configured to:
store transaction information of the user; and
responsive to the secure circuit authenticating the user, send the transaction information via the NFC radio.

18. The computing device of claim 16, further comprising:
a power management circuit coupled to the button, wherein power management circuit is configured to:
manage power supplied to the computing device; and
send the notification of the mechanical input to the secure circuit.

19. The computing device of claim 18, wherein the power management circuit is configured to use a cryptographic key to encrypt the notification sent to the secure circuit, wherein the cryptographic key is unknown to the processor.

20. The computing device of claim 16, wherein the secure circuit is configured to:
indicate that the authentication of the user has failed based on the timestamp exceeding the threshold time period of the authentication.

* * * * *